UNITED STATES PATENT OFFICE.

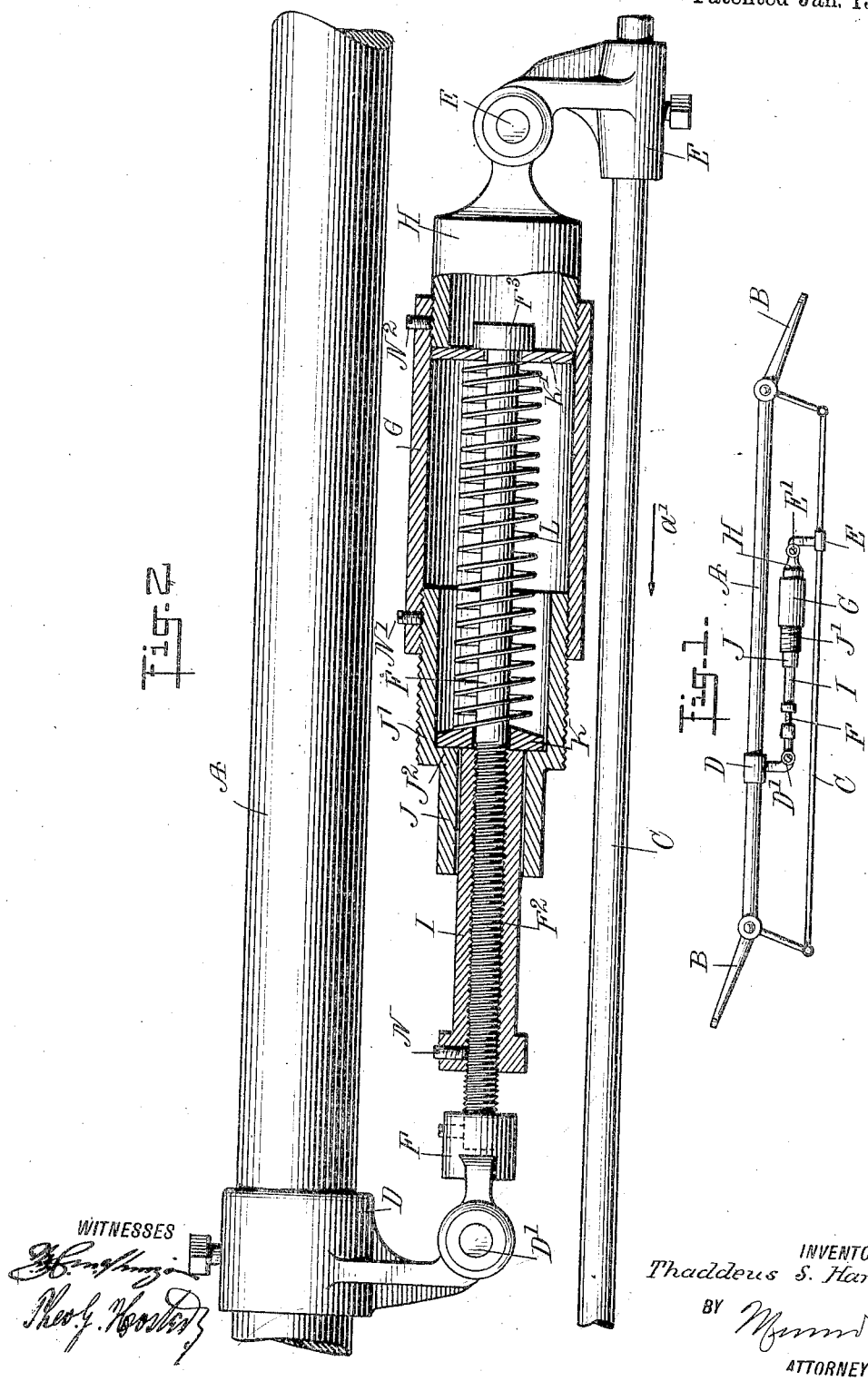

THADDEUS SIDNEY HARRIS, OF WAVERLY, ILLINOIS.

VEHICLE STEERING DEVICE.

1,084,430.

Specification of Letters Patent. Patented Jan. 13, 1914.

Application filed March 28, 1912, Serial No. 686,829. Renewed October 15, 1913. Serial No. 795,378.

*To all whom it may concern:*

Be it known that I, THADDEUS S. HARRIS, a citizen of the United States, and a resident of Waverly, in the county of Morgan and State of Illinois, have invented a new and Improved Vehicle Steering Device, of which the following is a full, clear, and exact description.

The invention relates to automobiles and other power-driven vehicles, and its object is to provide a new and improved vehicle steering device, arranged to allow convenient steering of the vehicle to the right or left, to return the parts with or without the aid of the driver to normal position, that is, with the front or steering wheels parallel with the longitudinal axis of the vehicle, and to hold the vehicle normally in a straight course even on rough roads and thus relieve the driver of undue strain.

For the purpose mentioned, use is made of brackets attached to the axle and steering rod members pivoted on the brackets and having a sliding connection with each other, and a single spring engaged at its ends by the said members to compress the spring on shifting the steering rod sidewise in either direction.

A practical embodiment of the invention is represented in the accompanying drawings forming a part of this specification, in which similar characters of reference indicate corresponding parts in both views.

Figure 1 is a plan view of the steering device; and Fig. 2 is an enlarged plan view of the same and showing the tension device in section.

On the ends of the axle A are pivoted the steering knuckles B connected with each other by the steering rod C, and on the said axle A and the steering rod C are secured brackets D and E, respectively, of which the bracket D is provided with a vertically-disposed pivot D' engaged by the head F' of a rod F extending into a tubular casing G provided at one end with a cap H, pivotally connected with a vertically-disposed pivot E' held on the bracket E.

The rod F is provided with a threaded portion F², on which screws a sleeve I slidingly engaging a bearing J having an enlarged tubular end J' screwing in the casing G at the end opposite the one having the cap H. The enlarged end J' forms with the bearing J a shoulder J², on which rests a washer K engaged by one end of a spring L coiled on the rod H extending within the casing G and the enlarged end J' of the bearing J. The other end of the spring L rests on a washer K' resting against the inner end of the cap H and on the head F³ formed on the inner end of the rod F, as plainly indicated in Fig. 2.

The set screw N serves to fasten the sleeve I in position on the threaded portion F² of the rod F, after the sleeve has been adjusted to regulate the tension of the spring L. A set screw N' serves to fasten the enlarged end J' of the bearing J in position in the casing G after the bearing is adjusted with the sleeve I and for the same purpose. A set screw N² serves to fasten the cap H in position on the casing G.

The operation is as follows: When the steering wheels are in normal position, that is, parallel to the longitudinal axis of the vehicle, then the several parts are in the position indicated in the drawings, that is, the washer K rests on the shoulder J² and the sleeve I, while the washer K' rests against the cap H and the head F³. Now when the steering rod C is shifted sidewise in the direction of the arrow a', then the cap H, the casing G and the bearing J are moved in the same direction whereby the washer K' carried along by the cap H compresses the spring L, and when the driver releases the rod C then the latter returns to normal position owing to the action of the compressed spring L. When the steering rod C is shifted to the right in the inverse direction of the arrow a', then the cap H, casing G and bearing J are moved in the same direction, and in doing so the washer K is carried along and compresses the spring L, and when the driver releases the steering rod C the parts are returned to normal position by the action of the spring L.

When it is desired to adjust the tension of the spring L the set screws N and N' are loosened, and the enlarged end J' of the bearing J is screwed in or out of the casing G and likewise the sleeve I is screwed on the threaded portion F² in a direction corresponding to that given to the enlarged end J' of the bearing J, so that when the parts are in normal position the washer K rests on both the shoulder J² and the inner end of the sleeve I.

It is understood that when the steering rod C is shifted sidewise from normal position to the right or left, or returns to normal position, it moves bodily toward or from the axle A, and by having the pivots D' and E' disposed vertically the spring device is free to move on the pivots without danger of binding of the parts.

From the foregoing it will be seen that by the arrangement described the steering device is automatically returned to normal position so that the front or steering wheels are parallel to the longitudinal axis of the vehicle.

It will be noticed that by the use of the arrangement described, the vehicle is normally held to a straight course even on rough roads, and thus relieves the driver of undue strain.

Having thus described my invention, I claim as new and desire to secure by Letters Patent:

1. A vehicle steering device, comprising an axle, steering knuckles pivoted on the said axle, a steering rod connecting the said steering knuckles with each other, brackets secured on the said axle and steering rod, a tubular casing provided at one end with a cap pivotally connected with one of the said brackets, a bearing held on the other end of the said casing, a sleeve slidable in the said bearing, a rod pivotally connected with the other bracket and on which the said sleeve is held adjustable, and a spring within the said casing and bearing with one end on the said rod and with the other end on the said bearing.

2. A vehicle steering device, comprising an axle, steering knuckles pivoted on the said axle, a steering rod connecting the said steering knuckles with each other, brackets secured on the said axle and steering rod, a tubular casing provided at one end with a cap pivotally connected with one of the said brackets, a bearing held on the other end of the said casing, a sleeve slidable in the said bearing, a rod pivotally connected with the other bracket and having a threaded portion on which screws the said sleeve, the rod extending into the casing and terminating in a head, washers held on the said rod and one of the washers being normally seated on the said cap and the said rod head and the other washer being normally seated on the said sleeve and bearing, and a spring coiled on the said rod within the said casing, the ends of the springs resting on the said washers.

In testimony whereof I have signed my name to this specification in the presence of two subscribing witnesses.

THADDEUS SIDNEY HARRIS.

Witnesses:
  J. ROSCOE CARUTHERS,
  J. C. DEATHERAGE.